(12) United States Patent
Zhang et al.

(10) Patent No.: US 9,110,769 B2
(45) Date of Patent: Aug. 18, 2015

(54) CODE-CLONE DETECTION AND ANALYSIS

(75) Inventors: Dongmei Zhang, Bellevue, WA (US); Yingnong Dang, Beijing (CN); Yingjun Qiu, Hangzhou (CN); Song Ge, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 980 days.

(21) Appl. No.: 12/752,942

(22) Filed: Apr. 1, 2010

(65) Prior Publication Data
US 2011/0246968 A1 Oct. 6, 2011

(51) Int. Cl.
*G06F 9/44* (2006.01)

(52) U.S. Cl.
CPC . *G06F 8/751* (2013.01); *G06F 8/71* (2013.01); *G06F 8/75* (2013.01)

(58) Field of Classification Search
None
See application file for complete search history.

(56) References Cited

U.S. PATENT DOCUMENTS

| | | | |
|---|---|---|---|
| 7,072,796 B2 * | 7/2006 | Kataoka | 702/181 |
| 8,209,665 B2 * | 6/2012 | Rama et al. | 717/122 |
| 8,224,830 B2 * | 7/2012 | Bidlack | 707/758 |
| 8,261,237 B2 * | 9/2012 | Zeidman | 717/123 |
| 8,312,427 B2 * | 11/2012 | Hutchison et al. | 717/110 |
| 2004/0210421 A1 * | 10/2004 | Kataoka | 702/186 |
| 2005/0234887 A1 * | 10/2005 | Harako | 707/3 |
| 2006/0004528 A1 * | 1/2006 | Uehara et al. | 702/20 |
| 2006/0106773 A1 * | 5/2006 | Chang et al. | 707/3 |
| 2006/0143222 A1 * | 6/2006 | Daniel | 707/102 |
| 2006/0242631 A1 * | 10/2006 | Andersen et al. | 717/137 |
| 2008/0184369 A1 * | 7/2008 | Ahn et al. | 726/23 |
| 2009/0089754 A1 * | 4/2009 | Zeidman | 717/123 |
| 2009/0164984 A1 * | 6/2009 | Woods | 717/154 |
| 2009/0234826 A1 * | 9/2009 | Bidlack | 707/5 |
| 2009/0241098 A1 | 9/2009 | Lobo et al. | |
| 2009/0313271 A1 * | 12/2009 | Zeidman | 707/100 |
| 2010/0199263 A1 * | 8/2010 | Clee et al. | 717/125 |
| 2011/0083187 A1 * | 4/2011 | Malanov | 726/24 |

(Continued)

FOREIGN PATENT DOCUMENTS

| | | |
|---|---|---|
| GB | WO9503579 A1 | 2/1995 |
| GB | WO2007099324 A1 | 9/2007 |

OTHER PUBLICATIONS

Ribler et al., "Using Visualization to Detect Plagiarism in Computer Science Classes", 2000, Proceedings of the IEEE Symposium on Information Visualization 2000 (InfoVis'00), pp. 1-5.*

(Continued)

*Primary Examiner* — Thuy Dao
*Assistant Examiner* — Stephen Berman
(74) *Attorney, Agent, or Firm* — Gregg Wisdom; Judy Yee; Micky Minhas

(57) ABSTRACT

Techniques for detecting, analyzing, and/or reporting code clone are described herein. In one or more implementations, clone-code detection is performed on one or more source code bases to find true and near clones of a subject code snippet that a user (e.g., a software developer) expressly or implicitly selected. In one or more other implementations, code clone is analyzed to estimate the code-improvement-potential (such as bug-potential and code-refactoring-potential) properties of clones. One or more other implementations present the results of code clone analysis with indications (e.g., rankings) of the estimated properties of the respective the clones.

20 Claims, 8 Drawing Sheets

(56) References Cited

U.S. PATENT DOCUMENTS

2011/0184938 A1* 7/2011 Hill .............................. 707/722
2012/0265744 A1* 10/2012 Berkowitz et al. ............ 707/705

OTHER PUBLICATIONS

Geiger et al., "Relation of Code Clones and Change Couplings", 2006, L. Baresi and R. Heckel (Eds.): FASE 2006, LNCS 3922, pp. 411-425, 2006.*
Komondoor et al., "Using Slicing to Identify Duplication in Source Code", 2001, pp. 1-18, downloaded from the Internet on Feb. 26, 2013 <url>:http://pages.cs.wisc.edu/~raghavan/sas01.pdf.*
Kamiya et al., "CCFinder: A Multilinguistic Token-Based Code Clone Detection System for Large Scale Source Code", 2002, IEEE Transactions on Software Engineering, vol. 28, No. 7, Jul. 2002, pp. 654-670.*
Roy et al., "NICAD: Accurate Detection of Near-Miss Intentional Clones Using Flexible Pretty-Printing and Code Normalization", 2008, The 16th IEEE International Conference on Program Comprehension, pp. 172-181.*
Baxter et al., "Clone Detection Using Abstract Syntax Trees," International Conference on Software Maintenance, 1998, International Conference on, pp. 368-377.*
Kim et al., "An empirical study of code clone genealogies," 2005, Proceedings of the 10th European software engineering conference held jointly with 13th ACM SIGSOFT international symposium on Foundations of software engineering, pp. 187-196.*
Lee et al., "SDD: high performance code clone detection system for large scale source code," 2005, OOPSLA '05 Companion to the 20th annual ACM SIGPLAN conference on Object-oriented programming, systems, languages, and applications, pp. 140-141.*
Baxter et al., "Using Clone Detection to Manage a Product Line", ICSR7 Workshop, 7th International Conference on Industrial Experience with Product Line Approaches, Austin, Texas, Apr. 15-19, 2002, 3 pages, retrieved on Nov. 30, 2009 at <<http://www.semdesigns.com/Company/Publications/Baxter-Churchett-CloneDR-Paper.pdf>>.
Biehl et al., "CloneAnalyzer", Software Project, Jan. 31, 2005, 4 pages, retrieved on Dec. 1, 2009 at <<http://cloneanalyzer.sourceforge.net/manual/index.html>>.
Chiu et al., "Beyond Clone Detection—CS846 Course Project", Cheriton School of Computer Science, University of Waterloo, Software Evolution Project Report, Apr. 8, 2007, 21 pages, retrieved on Nov. 30, 2009 at <<http://www.cs.uwaterloo.ca/~dhirtle/publications/beyond_clone_detection.pdf>>.
Livieri et al., "Very-Large Scale Code Clone Analysis and Visualization of Open Source Programs Using Distributed CCFinder: D-CCFinder", IEEE Computer Society, International Conference on Software Engineering, Minneapolis, Minnesota, May 20-26, 2007, pp. 106-115, retrieved on Nov. 30, 2009 at <<http://sel.ist.osaka-u.ac.jp/~lab-db/betuzuri/archive/648/648.pdf>>.
Rieger et al., "Visual Detection of Duplicated Code", Workshop on Object-Oriented Technology, Lecture Notes in Computer Science, vol. 1543, Brussels, Belgium, Jul. 20-24, 1998, pp. 75-76, retrieved on Nov. 30, 2009 at <<http://scg.unibe.ch/archive/papers/Rieg98aEcoopWorkshop.pdf>>.

* cited by examiner

```
[421] int k = 0;
[422] double d1 = 0;
[423] for (int i = 0; i < n;
        i++)
      {
[425] if ( i % 2 == 0)
      {
[424] k += i * i;
[426] d1 += sin(i);
      }
[427] printf("%d\n", i)
      }
```
420

```
[411] int k = 0;
[412] double d = 0;
[413] for (int i = 0; i < n;
        i++)
      {
[414] k += i;
[415] if ( i % 2 == 0)
      {
[416] d += sin(i);
      }
      }
```
410

☐ Exactly same    ▨ Similar logic    ▨ Different logic    ■ Extra logic    (Dis) Disordered

Fig. 4

CODE-CLONE DETECTION AND ANALYSIS

BACKGROUND

For efficiency in programming, software developers often duplicate sections of source code in numerous locations within programming projects. Reusing a portion of source code via copy-and-paste with or without some degree of modifications or adaptations is called "code cloning" and the resulting copied portion is called "code clone," or more simply a "clone." Code cloning is a common behavior of software developers for quick code reuse. In general, the amount of code clones is likely to increase as the scale of code bases increases. A source code base of a programming project (e.g., an application or an operating system) is the collection of the source code of the bulk of the computer programs that make up the project.

In many cases, unbridled code cloning negatively impacts the overall code quality by introducing potentially undetected cloning errors and potentially unnecessary redundancy. Consequently, unbridled code cloning increases testing and code maintenance costs. For example, it is a common problem that developers fix a bug in one piece of code but forget to apply the fix to its clones. This problem is more severe if the bug reveals a security issue. Also, for example, a high degree of clone coding may cause code bloating. Code bloating occurs when code clone is unnecessarily repeated in the code base.

It still remains a great challenge today to efficiently detect, analyze, and report code clones in large-scale code bases to enable developers to take effective action.

SUMMARY

Described herein are techniques for code-clone detection, analysis, and/or reporting. With one or more implementations of the techniques described herein, code-clone detection is performed on one or more source code bases to find true and near clones of a subject code snippet that a user (e.g., a software developer) expressly or implicitly selected. In one or more other implementations, code clone is analyzed to estimate the code-improvement-potential, (such as bug-potential and code-refactoring-potential) properties of clones. These techniques may also present the results of code clone analysis with indications (e.g., rankings) of the estimated properties in association with the clones.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4 is an illustration of an exemplary graphical user interface (GUI) that may result from implementations of the reporting techniques for code-clone analysis described herein. FIG. 4 also demonstrates the comparing and contrasting of code-clone pairs.

DETAILED DESCRIPTION

Figure 1:
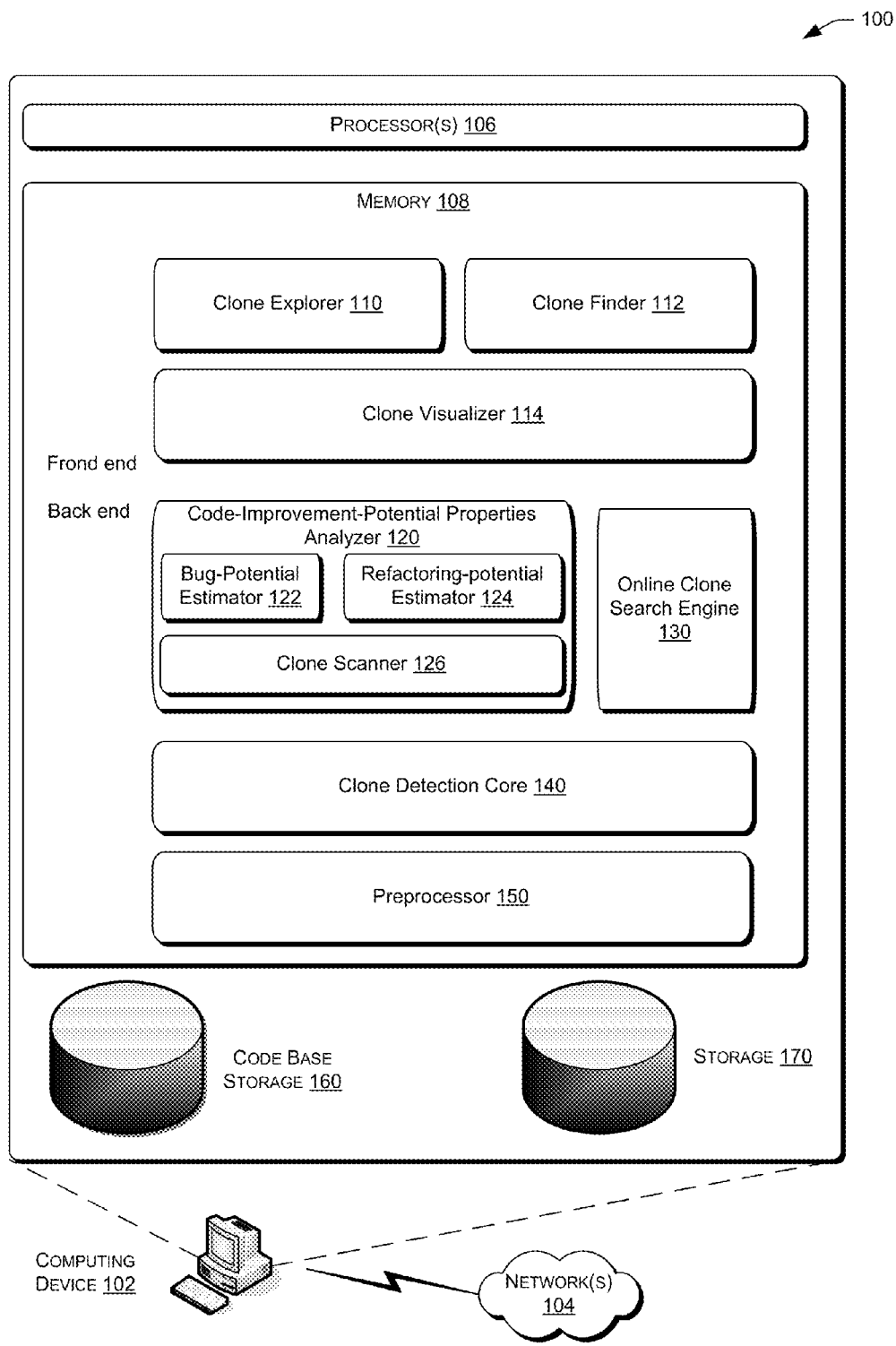
FIG. 1 illustrates an exemplary computing architecture that implements techniques for code-clone detection, analysis, and/or reporting described herein.

The disclosure describes techniques for code-clone detection, analysis and/or reporting. These scalable and actionable techniques may efficiently detect and analyze code clones in large-scale code bases so that software developers can easily take concrete actions against analyzed clones. These techniques may be used to determine the code-improvement properties of found clones. Such properties include bug potential and code-refactoring potential of detected clones. These techniques may also be used to provide rich reporting and visualization to intuitively help software developers to recognize code clones and recognize which actions to take regarding this code.

The following is a description of an operational use of an implementation employing the techniques described herein. A software developer, for example, may be examining, reviewing, fixing, or otherwise directly observing a section of source code of a source code base (or simply, a "code base"). She may be doing this to, for example, fix a bug found in that code section. However, after fixing the bug in this section of code, she may need to fix that same bug in the same or similar code sections that are scattered throughout the code base. In some instances, those same or similar code sections were copied and pasted (and possibly slightly altered thereafter) into the code base when the code base was initially programmed. However, now when debugging, the programmer has her work multiplied because the bug was part of the copied code clone.

With conventional solutions, she would be limited to brute-force approaches for some or all of the searching, finding, analyzing and fixing of buggy cloned code. The conventional solutions are limited by the size or characteristics of the code base to be searched, the ability to find buggy code, and the ability to present results of detection and analyses in a usable and useful manner to the software developer. Moreover, none of the conventional solutions offered anything that allowed the software developer to have an "online" or "on-the-fly" detection of code clone.

Conventionally, all code-clone detection is performed "offline." Offline code-clone detection is where the entire source code is searched exhaustively to find all code-clone pairs in the source code. A code-clone pair is two sections of code where one is a clone of the other. Depending upon the size of the source code base, this offline code-clone detection may take hours upon hours. One of the inspirations, which led to the implementations described herein, is an appreciation that a software developer may not want to know about all clone pairs (and experience the wait for the offline results). Rather, she may simply be interested in the clones of a particular section of code that she is working on at the moment. Using the techniques described herein, she may do online or on-the-fly code-clone detection, which focuses on quickly finding clones of a particular section of code of interest to the developer.

Also described herein are other implementations of code-clone analysis and reporting techniques that further help the software developer in her quest for better quality code.

This brief introduction, including section titles and corresponding summaries, is provided for the reader's convenience and is not intended to limit the scope of the claims, nor the proceeding sections.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Example Computing Architecture

FIG. 1 illustrates an exemplary computer architecture 100 that may implement the described scalable techniques for detecting, analyzing and/or reporting code clone. The architecture 100 may include at least one computing device 102, which may be coupled together via a network 104 to form a distributed system with other devices. While not illustrated, a user may operate the computing device and such a user is typically a software developer. Also not illustrated, the computing device 102 has input/output subsystems, such as a keyboard, mouse, monitor, speakers, etc. The network 104, meanwhile, represents any one or combination of multiple different types of networks, interconnected with each other and functioning as a single large network (e.g., the Internet or an intranet). The network 104 may include wire-based networks (e.g., cable) and wireless networks (e.g., cellular, satellite, etc.).

The computing device 102 may include one or more processors 106 as well as memory 108. Residing in the memory are backend and frontend components of a code-clone detection, analysis, and reporting system, which are shown in FIG. 1 as components 110-150 stored in the memory 108. These components may be modules of computer-executable instructions, which are instructions executable on a computer, computing device, or the processors of a computer. While shown here as modules, the component may be embodied as hardware, software, or any combination thereof. Also, while shown here residing on the computing device 102, they may be distributed across many computing devices in the distributed system.

Figure 5:
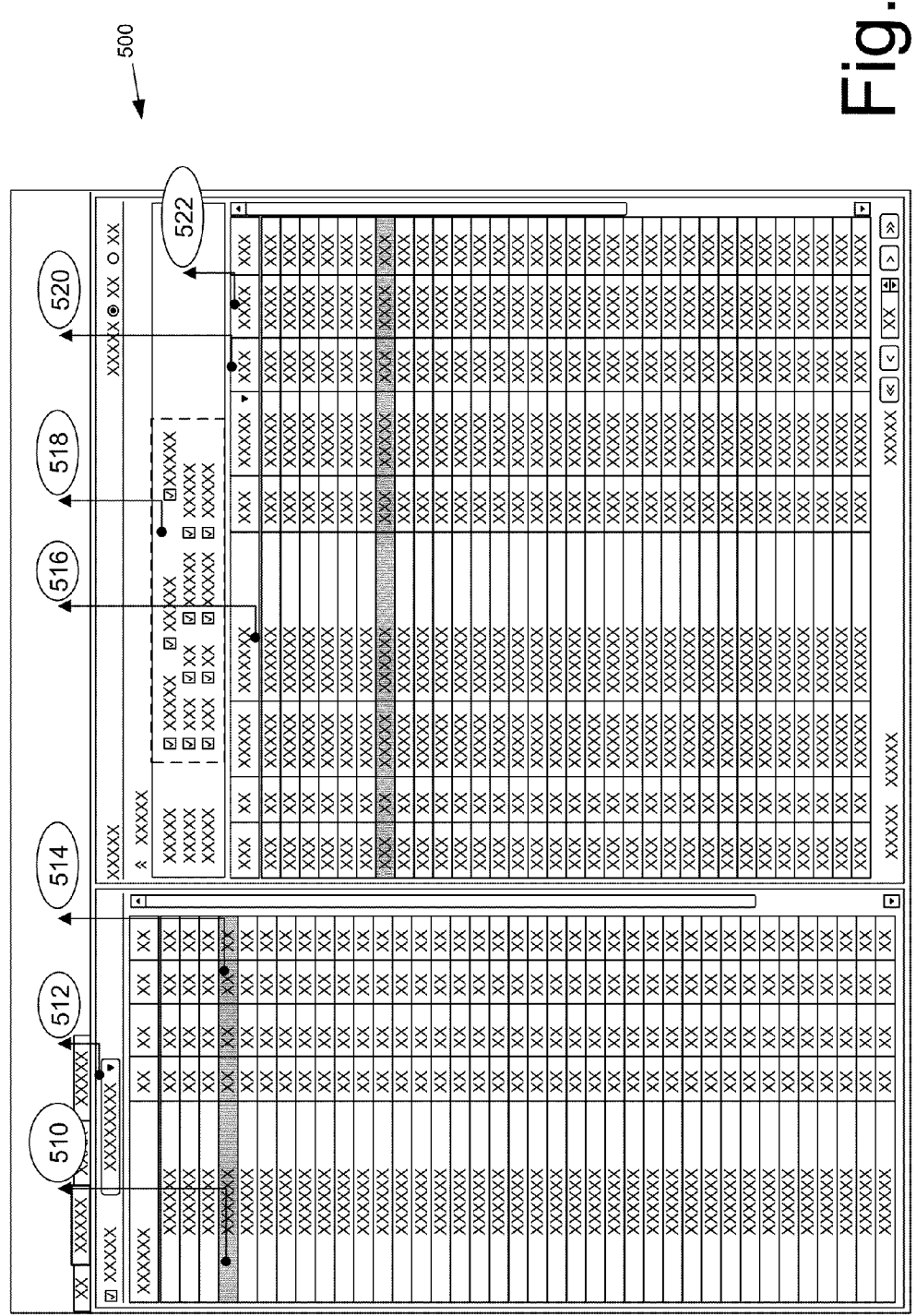
FIGS. 5-6 are examples of GUIs for reporting code clone that has been detected and for reporting analysis regarding the techniques described herein.
Figure 6:
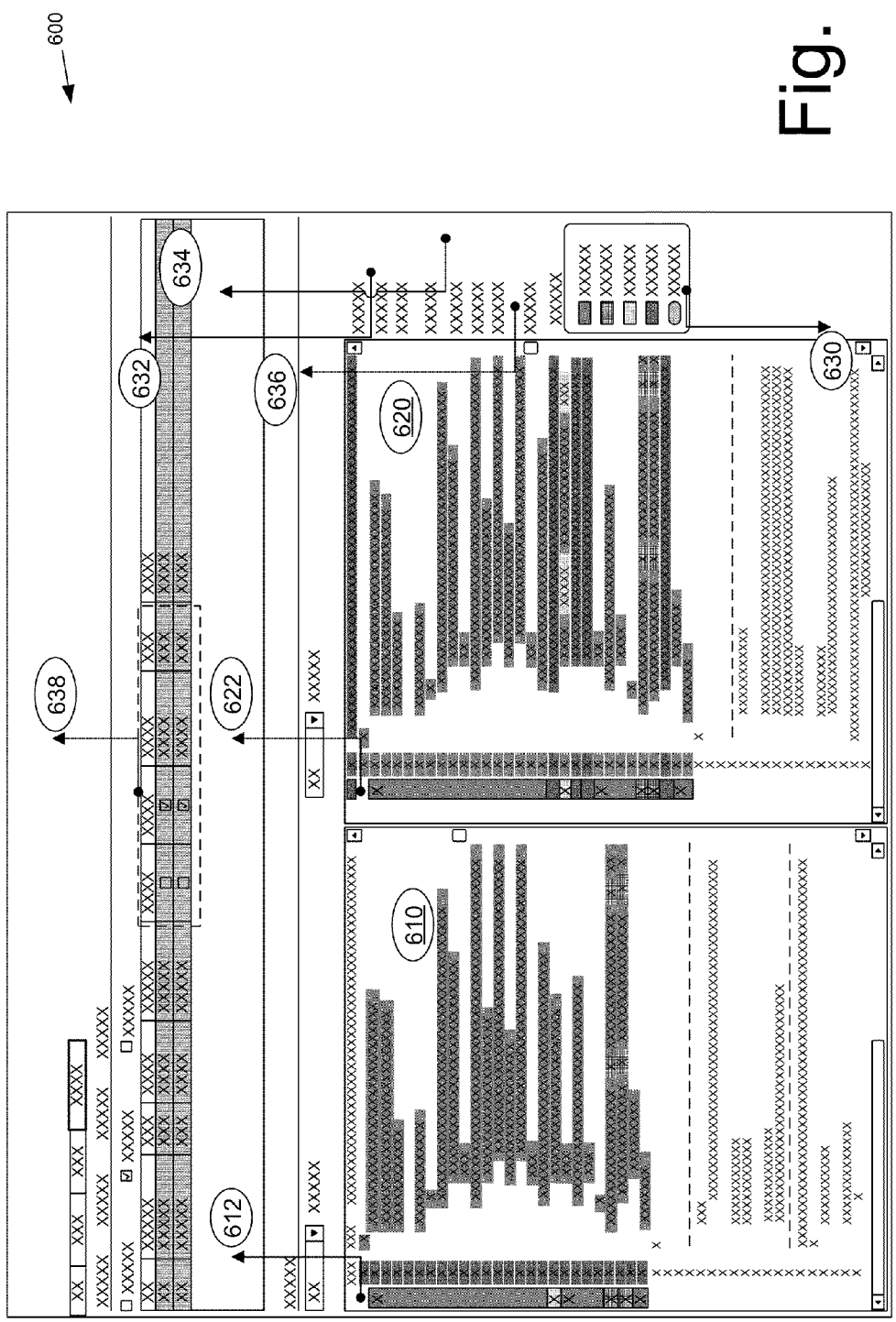

The frontend components include a clone explorer 110, a clone finder 112, and a clone visualizer 114. Alone or together, the clone explorer 110 and the clone visualizer 114 display or report the results of the code-clone detection and analysis. More precisely, they present the results for display on a presentation device, such as a computer monitor of the computing device 102. Working with the clone visualizer 114 the clone explorer 110 and clone finder 112 are graphics-based user interfaces (GUI) that present the clone analysis and search results of the backend components. Portions of examples of those GUIs are shown in FIGS. 4-6 and discussed below. More generally, the frontend components may not directly present or display, but instead may cause or help with a visual presentation or display of the code-clone reporting information described herein.

The backend components include code-improvement-potential properties analyzer 120, online clone search engine 130, clone detection core 140, preprocessor 150, code-base storage 160, and storage 170. The code-improvement-potential properties analyzer 120 includes a bug-potential estimator 122, a refactoring-potential estimator 124, and a clone scanner 126. The clone scanner 126 scans through clones that have already been located or locates new clones. The code-base storage 160 stores the source code bases. A source code base of a programming project (e.g., an application or an operating system) is the collection of the source code of the bulk of the computer programs which make up that project.

The techniques, described herein, are highly scalable so that they may operate on code bases of any scale, including large-scale code bases. Here a large-scale code base is one having tens of millions or even hundreds of millions lines of code. Furthermore, the techniques, described herein may operate on multiple code bases. This means that clones may be detected, analyzed, and reported across multiple code bases (e.g., programs like applications).

The code-improvement-potential properties analyzer 120 exhaustively finds and estimates code-improvement-potential properties of detected clones. The bug-potential estimator 122 estimates the potential or likelihood that a clone is buggy. The refactoring-potential estimator 124 estimates the potential or likelihood that a code clone can be re-factored, which involves replacing a code clone with a call to a single or shared function. Therefore, after refactoring the source code is reduced in overall size, but retains its functionality. Bug-potential and code-refactoring potential are two of many examples of how the described techniques may improve a code base by detecting code clone therein.

Another backend component is the online clone search engine 130 that finds some or all of the cloned copies of an input code snippet in the specified code base in the code-base storage 160. The clone search engine 130 is the search engine which drives the clone detection core 140.

A "code snippet" is a section or portion of contiguous source code of a code function (or just "function"). A function is a natural code boundary and is known to those of ordinary skill in the art of software development. For instance, a function may comprise a named section of a program that performs a specific task. Stated otherwise, a function may be deemed a type of procedure or routine.

To be pragmatic, a code snippet is defined to have a minimum number (e.g., 3 or 5, perhaps) of statements. A "statement" (i.e., "statement block" or "logic block") is known to those of ordinary skill in the art of software development. For instance, a statement may be an instruction written in a high-level programming language. Typically, a statement directs the computer to perform a specified action. Therefore, the non-instructional elements (e.g., comments) are not part of a statement.

The clone detection core 140 finds a group of clone code snippets in the source code base. The group of found clone code snippets includes not only identical clones, but also clones which are similar but not identical. The preprocessor 150 does preprocessing of the source code for the clone detection core 140. In short, the preprocessor 150 removes irrelevant (e.g., non-functional) material in the source code and re-formats the source code.

In one or more implementations, the clone detection core 140 performs the fundamental code-clone functionality. Given an index of a code base or code bases, and an input code snippet, the clone detection core 140 may return a list of code clones of the input code snippet. The clone detection core may be used in either "offline" on "online" fashion. In the "online" fashion, the online clone search engine 130 accepts a code snippet from a user, and then calls the clone detection core on-the-fly. The input snippet from user is not predictable and may well not be the same as any code snippet in the specified code base. This means that the code clone results of a query is not computable ahead of time. Of course, this might not be so in other alternative implementations that does not utilize on-the-fly based queries. In the "Offline" fashion, the clone scanner 126 feeds all functions in code bases one by one to the clone detection core 140 as the input code snippet 140, and the clone detection core 140 returns all code clones for each function.

The described backend components may be parallelized in a distributed computer cluster. The preprocessor 150 may partition the code bases and build indices for each partition. There may be multiple instances of the online clone search engine 130 and each may be run against the same number of source code partitions to compute the clones of the input code snippet.

One or more implementations, like those described herein, may provide two integration points for other applications or systems to utilize its functionalities. Web service APIs (application programming interfaces) may be designed to expose the clone search service (such as that provided by online clone search engine 130). The clone detection and analysis results generated by the code-improvement-potential properties analyzer 120 may be accessed via another set of web service APIs. Applications that consume clone results may utilize these APIs to integrate with one or more implementations.

Online Code-clone Detection Subsystem

Figure 2:
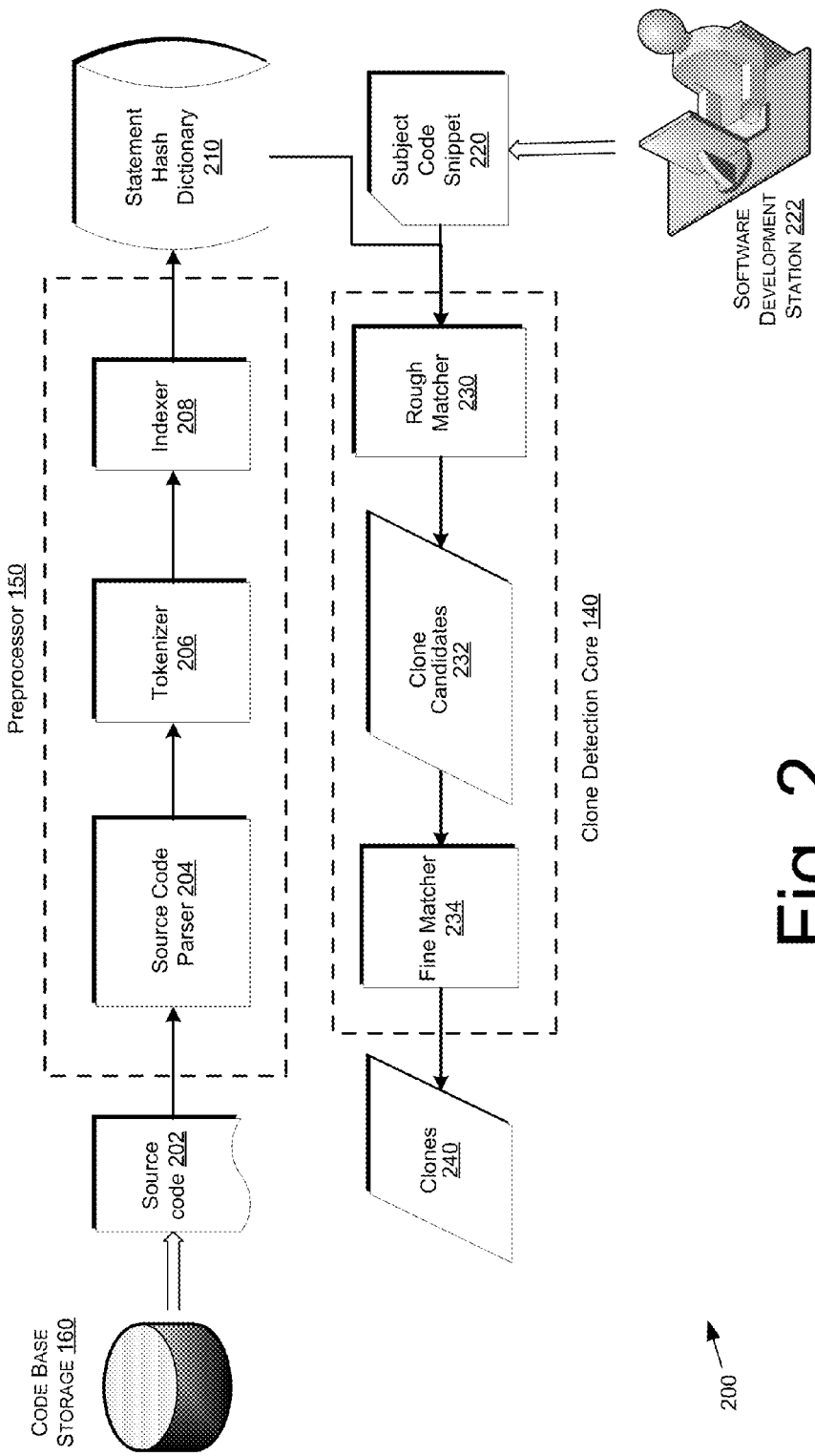
FIG. 2 is a block diagram of portions of the architecture of FIG. 1 in greater detail. The illustrated portions, in the example, implement techniques related to code-clone detection described herein.

FIG. 2 is a block diagram that shows an online code-clone detection subsystem 200, which includes the clone detection core 140 and the preprocessor 150 of FIG. 1, but described with additional detail. One or more implementations perform clone detection using a token-based approach that consists of three operations: preprocessing, rough-matching, and fine-matching. The preprocessor 150 performs the preprocessing and the clone detection core 140 performs the rough- and fine-matching.

During preprocessing, the source code in the specified code base is parsed, tokenized and indexed. Given a subject code snippet, rough matching is performed to find a list of candidate functions that contain possible cloned snippets that might match the subject code snippet. Then, the fine-matching of the subject code snippet and each clone candidate function of the list of candidate functions produces a more accurate listing of clones.

FIG. 2 shows the preprocessor 150 receiving source code 202 from the code base of the code-base storage 160. The preprocessor 150 includes a source code parser 204, a tokenizer 206, and an indexer 208. The results of the preprocessor 150 are stored in a statement hash dictionary 210, which is an indexed data structure that stores the relationship between the hash of each statement and the location of each statement in associated source code 202 (and its associated code base). The statement hash dictionary 210 may be stored in the memory 108 or the storage 170.

The source code parser 204 of the preprocessor 150 parses the source code 202 (which is pulled from the specified code base of the code-base storage 160). The source code parser 204 skips comments in the source code 202 and retrieves function boundaries along with statements in function definitions. In addition, the source code parser 204 normalizes (e.g., re-formats) the statements. This may include removing extra white spaces and merging break lines of a statement into one line in order to remove formatting differences. In one or more implementations of the source code parser 204, its parsing is much lighter compared to the comprehensive parsing functionalities of compilers. Compared with conventional parse-tree based clone detection approaches, one or more implementations described herein have a practical advantage of compiler independence. Because of that, one or more implementations may be easily applied to languages whose parse-tree information is difficult to obtain (e.g., scripting languages like JavaScript™ object-oriented scripting language). In addition, the compiler independency property also makes the system working on multiple code bases easily. The reason is in practical, different code bases may require different build environment to compile. Dependency on compiler will make the whole system very complicated.

After parsing the statements of the source code 202 by the source code parser 204, the tokenizer 206 generates a token map for the normalized, parsed statements. Each keyword and operator of a statement is mapped to a unique token. Also, the identifiers and constants are mapped to the same token, respectively, to tolerate identifier renaming.

After tokenizing by the tokenizer 206, the indexer 208 indexes each tokenized statement. If no statement hash dictionary 210 exists, the indexer 208 creates one. Otherwise, the indexer 208 uses an existing statement hash dictionary 210 associated with source code 202 and/or the specified code bases. The indexer 208 assigns each tokenized statement a value (e.g., a hash value) and the same tokenized statements are assigned the same value. The location information of each statement inside its function definition is associated with the statement's index value. If multiple tokenized statements are the same, then the location information of each of the identical statements will be recorded at the corresponding index value in the statement hash dictionary 210.

The statement hash dictionary 210 (produced by the preprocessor 150) and a subject code snippet 220 are the input into the clone detection core 140. As its name implies, the clone detection core 140 detects code clone in specified source code 202 of all or part of a code base or of multiple code bases. The clone detection core 140 finds and identifies, at minimum, code snippets in functions that are identical to the subject code snippet in every way (after preprocessing, of course). These clone code snippets are all clones of the subject code snippet 220 in a very true and literal sense of the word. However, the clone detection core 140 of one or more implementations described herein does more than find exact duplicates of code snippets. It finds near clones as well. Indeed, unless the context indicates otherwise, references herein to "code clone" and the like includes near clones as well as true clones.

The "nearness" of the code clone is described as meeting and/or exceeding an adjustable threshold of similarity. Said another way, a pair of code snippets are considered to be a clone pair when their similarity metric (which is a measure of their similarity to each other) is greater than and/or equal to a defined similarity threshold. Said again a different way, a clone pair is defined as code snippets $sp_1$ and $sp_2$ having a similarity metric $S(sp_1, sp_2)$ greater than or equal to a defined similarity threshold $\alpha$:

$$S(sp_1, sp_2) \geq \alpha \tag{1}$$

The following helps explain this code clone definition further. Assume $sp_1$ is a code snippet (such as subject code snippet 220) in function $F_1$, $sp_2$ is a code snippet in function $F_2$, T is a tokenization function, and m represents a number of statements that match between $sp_1$ and $sp_1$. Said another way, there are m statements in $sp_1$ and $sp_2$, respectively, and these statements have one-to-one correspondence that satisfies the constraint $T(s_i^{sp_1})=T(s_1^{sp_2})$, $s_1^{sp_1}$ and $s_j^{sp_2}$ are the ith and jth statement in $sp_1$ and $sp_2$, respectively. The similarity metric of $sp_1$ and $sp_2$ is $$S(sp_1, sp_2) = \frac{m}{((LOC(sp_1) + LOC(sp_2))/2} \tag{2}$$

where $LOC(sp_1)$ and $LOC(sp_2)$ are the number of statements in $sp_1$ and $sp_2$, respectively. $F_1$ and $F_2$ may be the same function.

This definition is based upon an insight that the more commonly shared tokenized statements in $sp_1$ and $sp_2$ means that it is more likely for $sp_1$ and $sp_2$ to be clones. With this code-clone-similarity control offered by equations (1) and (2), software developers may precisely definite how similar a pair of code snippets must be in order to be considered a clone pair. Thus, by adjusting the similarity threshold, a developer controls the scope and size of the clones found by the clone detection core 140. In general, more near clones will be obtained if a smaller $\alpha$ is used, which means fewer tokenized statements are commonly shared.

In one or more implementations, the clone-pair definition focuses on code snippets with comparable sizes based on the assumption that copy-and-paste types of clones usually involve a non-significant amount of changes after code is cloned. In addition, this clone definition enables the detection of near clones with disordered statements, which is a potential source of bugs caused by unintentional changes after copy-and-paste actions.

As illustrated, FIG. 2 shows the clone detection core 140 receiving the subject code snippet 220 and the statement hash dictionary 210 as input. Also shown is a software developer working at a software-development workstation (e.g., a computing device), which is called herein a software development station 222.

A typical scenario involves a software developer using the software development station 222 working on the code snippets found in the source code 202 of the specified code base stored in the code-base storage 160. Indeed, she may be actively working on a particular code snippet of interest. That interest may be in the form of debugging, reprogramming, or just active interest for any reason that she might have.

Another typical scenario involves a software developer using the software development station 222 working on a code base or code bases trying to find all code clones inside it. The interest may be to identify all potential issues regarding code clones, for example, potential bugs caused by code cloning, potential code refactoring (e.g., removing) opportunities cased by code cloning.

Clone explorer 110 may help her to explore all code clones and clone analysis result generated by clone scanner 126 and code-improvement-potential properties analyzer 120. Clone explorer 110 also leverages clone visualizer 114 to show the difference between code clones. Clone finder 112 is GUI to facilitate the "on-the-fly" query of code clones. A user may input a code snippet to clone finder 112. Clone finder 112 sends the code snippet to online clone search engine 130 and clone search engine 130 returns a list of clones to clone finder 112. Subsequently, the clone finder 112 presents a list of clones returned by the online clone search engine 130 to the user and leverages clone visualizer 114 to show the clone difference.

In general, using one or more of the frontend components (e.g., the clone explorer 110, the clone finder 112, and the clone visualizer 114), she indicates her interest in the particular code snippet. That indication may, of course, be purposeful and expressed by selection of code, click of a button, selection of a particular interface, etc. But, in alternative implementations, that indication may be inferred or implied by, for example, the software developer spending time viewing, editing, etc. a particular code snippet. With an implicit selection implementation, a timer or particular event may trigger the implicit selection of a code snippet.

Once interest in a particular code snippet is indicated, it becomes the subject code snippet 220 and clone detection functionality of the clone detection core 140 is initiated. The initial operation of the clone detection core 140 is performed by the rough matcher 230. When given, as input, the code snippet 220 and the statement hash dictionary 210, the rough matcher 230 returns a list of candidate functions 232 that contains possible clones of the code snippet 220.

The rough matcher 230 reduces the search space from the entire code base (or even multiple code bases) to the list of clone candidates 232, which is of a much smaller scale. From there, the fine matcher 234 winnows down the list of clone candidates 232 to those that are actually clones 240 of the subject code snippet 220. More details about the rough- and fine-matching are found in a section below titled: "Additional Details of Example Techniques."

The clone code snippets found in the clones 240 are clones of subject code snippet 220 in accordance with clone pair definition and similarity metric equations, which are equations (1) and (2), respectively.

Code-clone Analysis Subsystem

Figure 3:
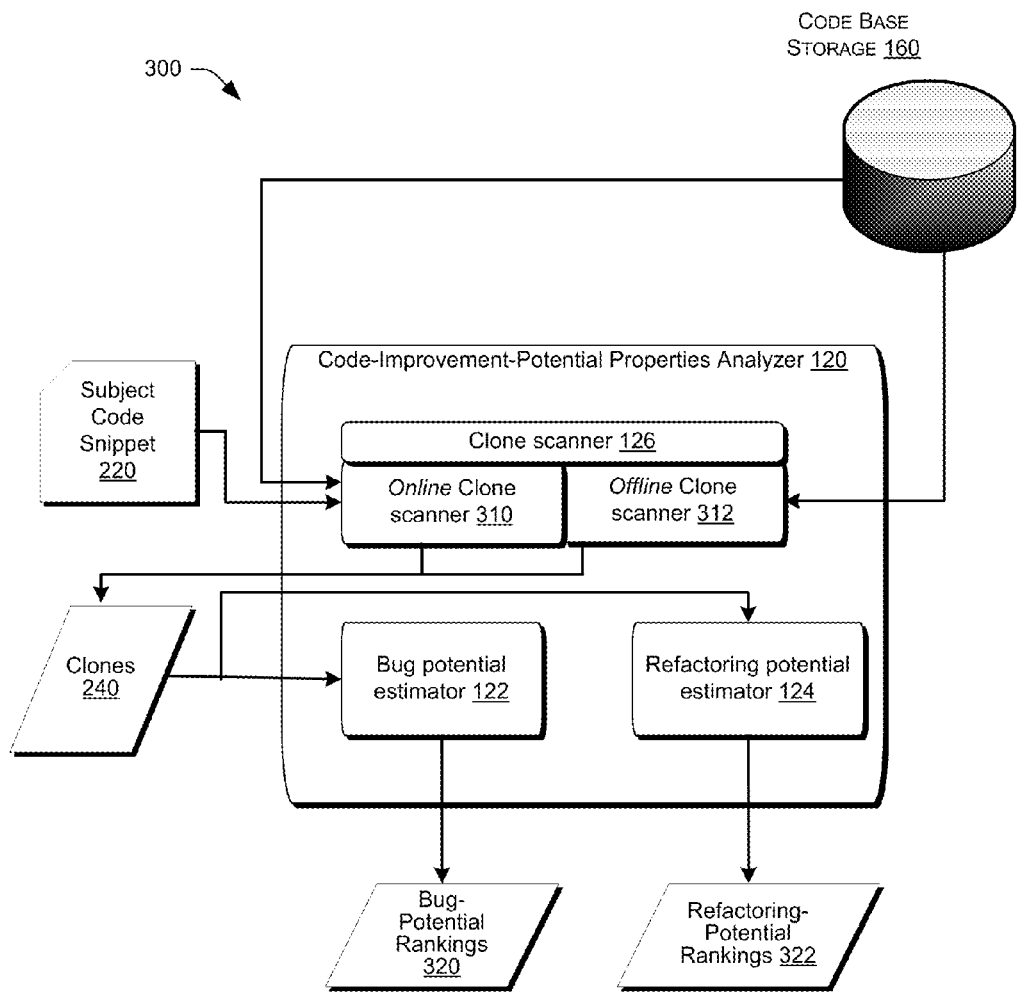
FIG. 3 is a block diagram of other portions of the architecture of FIG. 1 in greater detail. The illustrated portions, in the example, implement techniques related to code-clone analysis described herein.

FIG. 3 shows a code-clone analysis subsystem 300, which includes the code-improvement-potential properties analyzer 120. The analyzer includes the clone scanner 126. The clone scanner 126 has an online clone scanner 310 portion and an offline clone scanner 312 portion. The code-improvement-potential properties analyzer 120 can operate "online" or "offline."

In other words, it can, via the online clone scanner 310, receive the subject code snippet 220 and the found clones 240 resulting from an on-the-fly (i.e., online) code-clone detection (as described herein for the clone detection core 140). Alternatively, the analyzer 120 can, via the offline clone scanner 312, receive the subject code snippet 220 (which may be any code snippet and not one provided via a user selection) and unprocessed source code 202 from the code base in the code base storage 160. In doing this, the offline clone scanner 312 exhaustively searches the un-preprocessed source code 202 from the code base to find all clones of the subject code snippet 220. Alternatively still, the offline clone scanner 312 might not receive the subject code snippet 220 and instead search the un-preprocessed source code 202 for all clones that there are to be found.

Regardless of which approach is used, the code-improvement-potential properties analyzer 120 operates in a similar manner. That manner is to analyze the clones to determine if they have inherent properties that lend themselves to allow for improvement to the source code 202 by additional attention and programming by the software developer.

While other examples of the code-improvement properties exist, two of particular interest here are bug potential and refactoring potential. In short, the bug potential of a code clone is the chance that an inconsistent or inattentive change in a code clone introduced a bug. The refactoring potential is the chance that a code clone can be easily replaced by a call to a reusable duplicate.

The bug-potential estimator 122 calculates a quantitative estimate on how likely code clone is to be "buggy." The estimate may be an output of the estimator. Also, the clone code snippets may be ranked based upon that estimate and those bug-potential rankings 320 may be output. These estimates, ranking, or both may be stored with the code clone in a data structure that tracks that code. Also, it may be displayed and made available for manipulation via one or more of the frontend components (e.g., the clone explorer 110, the clone finder 112, and the clone visualizer 114).

The refactoring-potential estimator 124 calculates a quantitative estimate on how likely code clone may be re-factored. The estimate may be output. Also, the clone code snippets may be ranked based upon that estimate and those refactoring-potential rankings 322 may be output. These estimates, ranking, or both may be stored with the code clone in a data structure that tracks that code. Also, it may be displayed and made available for manipulation via one or more of the frontend components.

In order to help developers with bug fixing and code refactoring, the code-improvement-potential properties analyzer 120 analyzes the clone detection results and generates with quantitative estimates on how likely code clone is buggy or is re-factorable. This way the detected clones can be prioritized based on the analysis results, which helps developers focus on the high potential clones with their limited time and resources.

These estimates are based, at least in part, upon an analysis of the differences between the code clone pairs. So, given two clone functions $F_1$ and $F_2$, the code-improvement-potential properties analyzer 120 determines the differences between $F_1$ and $F_2$ in order to estimate the code-improvement-potential. Based on the fine matching result of $F_1$ and $F_2$, four types of matching statement blocks between $F_1$ and $F_2$ are generated.

Suppose $B_i$ and $B_j$ are two matching statement blocks (i.e., statements) in function clones $F_1$ and $F_2$ with $s_i^{B_i}$ and $s_1^{B_j}$ as matching statements in $B_i$ and $B_j$, respectively. T is a tokenization function and SC is a string comparison function. The four types of statement blocks are defined below.

Exactly matched block: $B_i$ and $B_j$ are called exactly matched blocks when $SC(s_i^{B_i}, s_i^{B_j})$=TRUE.

Similar logic block: $B_i$ and $B_j$ are called similar logic blocks when SC $(T(s_i^{B_i}), T(s_i^{B_j}))$=TRUE.

Different logic block: $B_i$ and $B_j$ are called different logic blocks when they are neither exactly matched blocks nor similar logic blocks; and they have at least 50% of tokens in common.

Extra logic block: A block B in $F_1$ and $F_2$ is called an extra logic block if it does not belong to any aforementioned types of blocks.

In addition to the above four types of matching statement blocks, the code-improvement-potential properties analyzer 120 also identifies the sequential differences of matching blocks using a disordered block concept: Disordered block. Suppose there are m matching blocks in $F_1$ and $F_2$; and the blocks in $F_1$ are ranked in ascending order $B_i$ (1≤i≤m). For an ordered block pair (Bi, Bj) in $F_1$, $(B_{i'}, B_{j'})$ is used to represent its correspondence in $F_2$. $B_{i'}$ is called a disordered block if i'>j'.

FIG. 4 illustrates these four types of blocks along with the disordered block. The code listings of clone pairs 410 and 420 ($F_1$ and $F_2$) are shown. Of course, this is merely one example of so many possible clone pairs. They are shown here to illustrate how code-improvement-potential properties analyzer 120 might automatically compare statement blocks of such clone pairs.

The code listing of clone pair 410 includes statement blocks 411-416. The code listing of clone pair 420 includes statement blocks 421-427. Blocks 411 and 421 are exactly matched blocks between the clone pairs 410 and 420. Similarly, blocks 413 and 423 are exactly matched blocks. And the same is true of blocks 415 and 425.

Blocks 412 and 422 are similar logic blocks. Likewise, blocks 416 and 426 are similar logic blocks. Between the clone pairs 410 and 420, the similar logic blocks differ merely in labeling. Blocks 412 and 416 have a "d" where blocks 422 426 have "d1" instead.

Block 414 and block 424 are a different logic blocks. The logic differs between the two blocks. Block 414 has "k+=i" while block 424 has "k+=i*i".

Block 427 has no equivalent in the clone 410. So, it is an extra logic block. Blocks 415 and 425 appear in a different ordering between the clone pairs 410 and 420. Therefore, blocks 415 and 425 are disordered blocks.

The inconsistency between clone pairs 410 and 420 ($F_1$ and $F_2$) includes the block types defined herein as well as disordered blocks of any type. These different types of inconsistencies play a role in estimating bug potential and code refactoring potential.

The bug-potential estimator 122 estimates clone related bug potential based on the categorization of differences in function clones. Different logic blocks, disordered blocks, and extra logic blocks indicate semantic level differences between function clones. A small amount of such differences may be indicators of bugs; while a large amount of such differences are likely to be caused by intentional changes. In other words, the bug-potential estimator 122 presumes that small inconsistencies between clone pairs correlates with the likelihood that the clone is buggy. That is because it is presumed that large differences were the results of a purposeful act by the software developer.

Based on this observation, a bug potential metric of a clone function pair $F_1$ and $F_2$ as follows is calculated by:

$$B(F_1, F_2) = \begin{cases} e^{-\alpha d_1/n_{avg} - \beta d_2/n_{avg} - \gamma d_3/n_{avg}} & \text{if } d_1 + d_2 + d_3 > 0 \\ 0 & \text{else} \end{cases} \quad (3)$$

where $d_1$ is the total number of statements in all different logic blocks in $F_1$ ($d_1$ is the same in $F_1$ and $F_2$); $d_2$ is the total number of statements in all extra logic blocks of $F_1$ and $F_2$; $d_3$ is the total number of inversed block pairs (i.e., disordered blocks) in $F_2$; α, β and γ are coefficients determined empirically; and $n_{avg}$ is the average number of statements in $F_1$ and $F_2$. The value of B ($F_1$, $F_2$) is in the range of [0, 1.0]. In at least one implementation, the value is linearly mapped to four discrete ranks (e.g., High, Moderate, Low and Zero) for ease of understanding the degree of bug-potential for a clone. This value and/or the ranking is the results shown at 320 of FIG. 3.

The refactoring-potential estimator 124 also estimates code-refactoring potential based on the categorization of differences in function clones. It is presumed here that it is relatively easier to re-factor large-sized exactly-same blocks and similar-logic blocks using techniques such as extraction and pull-up, the code refactoring potential metric is calculated by:

$$R(F_1, F_2) = \sum_{i=1}^{n} e^{-\rho(i-1)} \cdot \frac{LOC(B_i)}{n_{avg}} \quad (4)$$

where $B_i$ is the number of statements of the ith largest exactly-same or similar-logic block.

The value of $R(F_1, F_2)$ is in the range of $(0, \delta\ 0]$ Similar to the bug potential value, the value of $R(F_1, F_2)$ is also mapped to ranks of High, Moderate, Low and Zero. This value and/or the ranking is the results shown at 322 of FIG. 3.

Exemplary Frontend Components

The frontend components (e.g., the clone explorer 110, the clone finder 112, and the clone visualizer 114) provide a graphical user interface (GUI) for a software developer at, for example, her station 222. The clone visualization and reporting mechanism provides a rich and interactive user experience for developers to efficiently review the clone analysis results and take corresponding actions.

Clone Reporting

FIG. 5 shows an example of GUI 500 that the clone explorer 110 may generate. In one or more implementations, the clone explorer 110 is a clone reporting and exploration computer-executable module that runs on the computing device 102. Display fields 510-522 of FIG. 5 are highlighted areas of GUI 500 that are discussed here.

Display field 510 shows an example of how the clone explorer 110 displays and organizes clone statistics based on source tree hierarchy in order to enable a quick and easy developer's review at different source levels. Display field 512 is a drop-down list that allows pivoting the clone analysis results around bug potential (shown at display field 514), code refactoring potential, any other code-improvement-potential properties, and/or clone scope. Clone scope indicates whether cloned code is detected inside a file, cross-file, or cross-folder. For a selected folder in the left pane of the GUI 500, the list of clone functions along with sorting enabled bug potential and refactoring potential (display field 520) is displayed in the right pane (516). The GUI 500 provides filters (518) on clone scope, bug potential and refactoring potential to enable easy selection of interested clones.

Clone Visualization

FIG. 6 shows an example of GUI 600 that the clone visualizer 114 may generate. In one or more implementations, the clone visualizer 114 is a computer-executable module that runs on the computing device 102. It displays the results of the code-clone detection and analysis. Display fields 610-638 of FIG. 6 are highlighted areas of GUI 600 that are discussed here.

FIG. 6 shows two clone pairs or clone code snippets (610 and 620), which are displayed side-by-side for comparison. The clone visualizer 114 is designed to clearly show the matching blocks and the block types of a subject clone pair (610 and 620). This way, users can quickly capture whether there is any difference between the two cloned snippets, what kind of difference it is, and how much difference there is. In each of the displayed code snippets 610 and 620, the blocks of interest are numbered (in a manner like that described in relation to FIG. 4). They are also highlighted for correspondence display. In FIG. 6, for convenience of printing, various printing techniques for highlighting are used, such as shading, bolding, underlining, etc. The reader understands that, when implemented, other highlighting techniques may be used, such as color, shading, underscoring, blinking, or any other way available to highlight items (such as text) on a screen.

As illustrated in FIG. 6, matching blocks in the code snippets 610 and 620 are shown in display areas 612 and 622, and a legend that shows the highlight (e.g., color) coding for indicating different block types is shown at 630. The left and right source panes (where the code snippets 610 and 620 are shown) are synchronized. Furthermore, navigation buttons 632 are provided to navigate through source code by matching blocks instead of statements in order to improve review efficiency. Via options 636, users can take the immediate action of opening a bug once a clone is confirmed to be a bug or needs to be re-factored. Via options 634, users can copy the code out for more investigation.

Tagging

As shown in FIGS. 5 and 6, an option (at 522 and at 638) activates a tagging mechanism. With this tagging mechanism, a user may tag a detected clone code snippet. Some tags may be merely for commentary or documentation purposes unique to the user. Some tags may indicate "immunity" for a clone code snippet. Some of the detected clones are by-design and thus are desired by the software developer. Therefore, it is unnecessary and undesirable to have such clones included in a detection and analysis. When a clone is tagged as "immune" by the user, the clone is ignored by the code-clone detection, analysis, and/or reporting systems or techniques.

Still another purpose for the tagging is for feedback to product development. User feedback and evaluation results of a product implementing one or more of the code-clone detection, analysis, or reporting systems or techniques are collected and reported back to product development. This aids in further improvement of the product.

One example of the feedback may include using a tagging mechanism that allows users to label a clone as "confirmed bug" or "confirmed code refactoring opportunity." These tags can be further used to improve the bug potential and code refactoring potential estimator 122 and 124.

Example Processes

FIGS. 7-10 are flow diagrams illustrating example processes 700, 800, 900 and 1000 that implements the techniques described herein for code-clone detection, analysis, and/or reporting. Each of these processes is illustrated as a collection of blocks in a logical flow graph, which represents a sequence of operations that can be implemented in hardware, software, or a combination thereof. In the context of software, the blocks represent computer instructions stored on one or more computer-readable storage media that, when executed by one or more processors of such a computer, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

Figure 7:
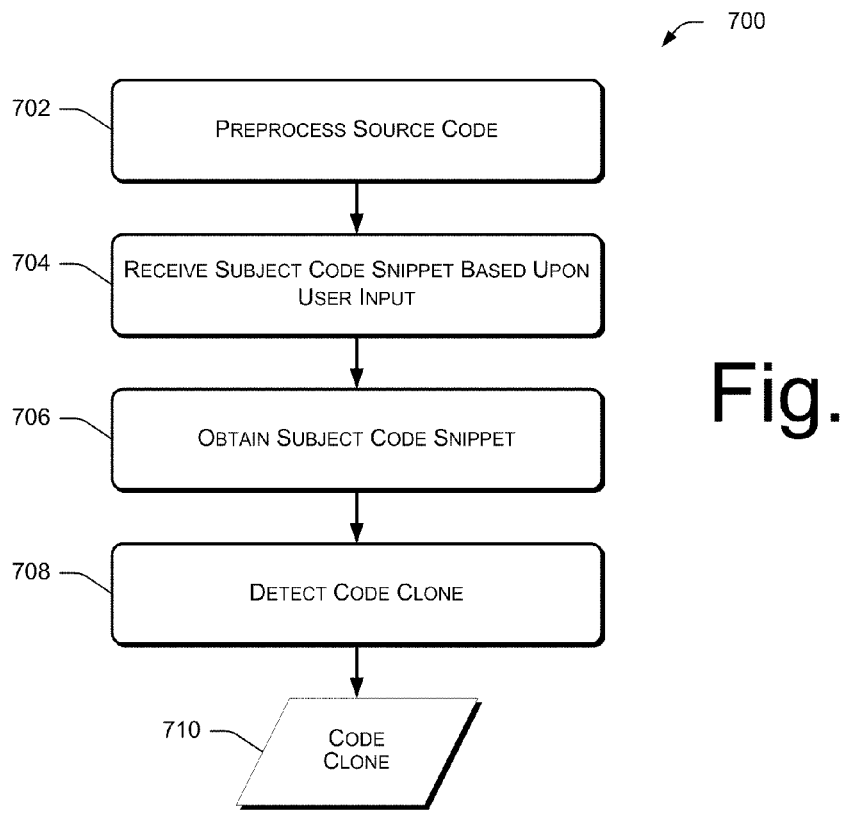
FIGS. 7-10 are flow diagrams of example processes for detecting, analyzing and/or reporting code clone using the techniques described herein.

FIG. 7 illustrates the process 700 for code-clone detection, which includes operation 702. At this operation, a computing device (such as computing device 102), which is configured to detect code clone of the source code base, preprocesses the source code 202 to generate a statement hash dictionary 210. The computing devices that are configured to detect code clone of the source code bases qualifies as a particular machine or apparatus.

For one or more implementations of the preprocessing, the source code of the source code bases is parsed in order to identify and normalize statements in the source code of the source code bases. Then, those identified and normalized statements are tokenized so that keywords and operators of each statement are mapped to a unique token. The tokenized statements are then indexed to create an index value for each tokenized statement and each index value (e.g., hash value) is stored in the statement hash dictionary 210 with an association between the index value of each tokenized statement and one or more locations in the source code of the source code bases where each unique tokenized statement is found.

Of course, other conventional and new clone-detection preprocessing approaches, other than tokenization, may additionally or alternatively be used. Examples of those approaches include text-based (e.g., parameterized matching), abstract-syntax-tree-based (e.g., tree-edit-distance), and semantics-based (e.g., using a dependency graph) approach.

At operation 704 and after preprocessing, the computing device receives a selection of an input code snippet (e.g., subject code snippet 220 of FIG. 2) based upon user input. The user input may include a purposeful selection by a software developer or the selection may be inferred by the user's activity (e.g., editing a particular code snippet).

Next, operation 706 is in response to the receiving of the selection of the subject code snippet 220 based upon user input (e.g., from a user-interface). At operation 706, the computing device 102 obtains the subject code snippet 220. For example, the subject code snippet 220 may be obtained via a communications medium or pulled from working memory (such as RAM) or storage (such as a hard disk, flash memory, an optical disc, etc.).

The process 700 then proceeds to operation 708, at which point the computing device finds a group of clone code snippets in the source code bases (such as those stored in 160). This is one example of code-clone detection. Here both true clone pairs (where pairs are completely identical) and near clones are detected. For each of the near clones, a similarity metric, relative to the subject code snippet 220, is calculated (see equation 2). A near clone is considered a clone found here when it has a similarity metric that meets and/or exceeds a defined similarity threshold (see equation 1). That threshold may be preset or user-adjustable.

The finding operation 708 includes rough-matching the subject code snippet 220 to a list of candidate functions (e.g., the clone candidates 232 of FIG. 2) in the source code bases. To qualify as a candidate function, it must be determined to include a possible cloned code snippet that has a likelihood of being a clone or near clone of the subject code snippet 220 based upon a rough-matching calculation of functions in the source code bases. That rough-matching calculation is elaborated further section below titled: "Additional Details of Example Techniques."

Since this is a rough-matching, not all of the candidate functions will include cloned code snippets which are clones or near clones. Therefore, at least some of the possible cloned code snippets have the similarity metric that is below the defined similarity threshold.

Next, the candidate functions are fine tuned by fine-matching the subject code snippet 220 with the list of candidate functions. The fine-matching includes identifying the clone code snippets of the group in the list of candidate functions that have the similarity metric that meets and/or exceeds the defined similarity threshold. The fine-matching calculation is elaborated further section below titled: "Additional Details of Example Techniques."

The end product 710 of process 700 is a set of code clone (e.g., clones 240) that is clones or near clones of the subject code snippet 220 in accordance with clone pair definition and similarity metric equations, which are equations (1) and (2), respectively.

Figure 8:
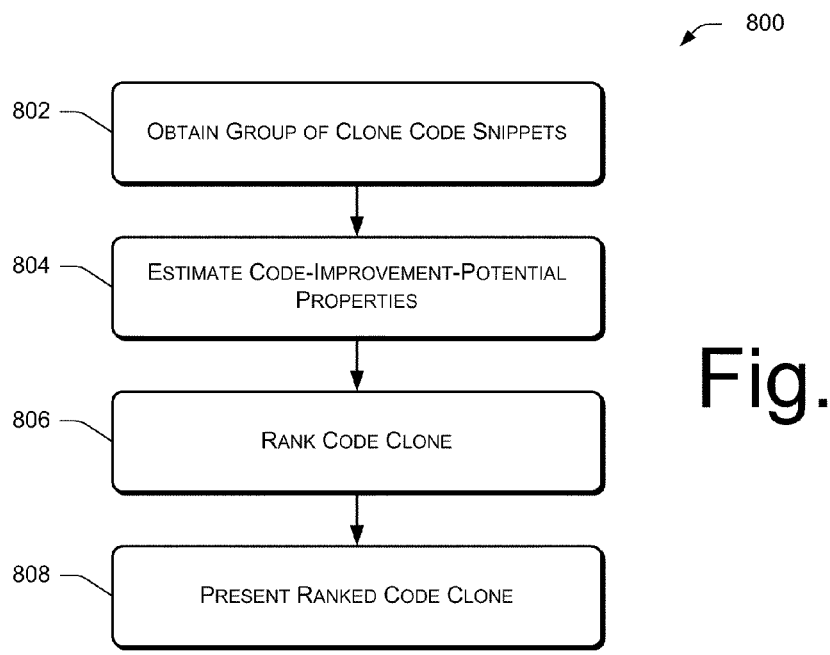

FIG. 8 illustrates the process 800 for code clone analysis and includes an operation 802. Here, a computing device (such as computing device 102), which is configured to analyze code clone of the source code bases, obtains a group of clone code snippets. Each clone code snippet is a clone or near clone of the subject code snippet 220. The computing devices that are configured to analyze code clone qualify as particular machines or apparatuses. The end product 710 of process 700 may be the group of clone code snippets obtained at operation 802. Alternatively, the obtained group may be a set of clones obtained via some offline clone-detection approaches (either new or conventional).

Next, at operation 804, the computer device estimates code-improvement-potential properties of the of the clone code snippets of the group of found clone code snippets. As part of this estimation, the computer device compares and contrasts the statements of the subject code snippet and the statements of each of the clone code snippets. When comparing and contrasting, it identifies statements between the subject code snippet and the cloned code snippets that are exactly matched, similarly matched, unmatched (different), disordered (matched but in the wrong order), and/or extra or missing (found in one but not the other).

In one or more implementations, the estimating of operation 804 includes a calculation of bug-potential estimation metrics of the clone code snippets of the group. The bug-potential estimation metrics is one of the code-improvement-potential properties. The bug-potential estimation metric of a specific code clone is a measure of a likelihood that the specific code clone is "buggy." Here, it is presumed that small inconsistencies between clone pairs correlates with the likelihood that the clone is buggy. That is because it is presumed that large differences were the results of a purposeful act by the software developer.

In one or more implementations, the estimating of operation 804 includes a calculation of code-refactoring-potential estimation metrics of the clone code snippets of the group. The code-refactoring-potential estimation metrics being one of the code-improvement-potential properties. The code-refactoring-potential estimation metric of a specific code clone being a measure of a likelihood that the specific code clone is a viable candidate for refactoring, and code-refactoring-potential estimation metrics being one of the code-improvement-potential properties.

Next, at operation 806, the computing device 102 ranks at least some of the clone code snippets of the group based upon the of the estimated code-improvement-potential properties (e.g., bug-potential and refactoring-potential).

At operation 808, the computing device 102 (which is further configured to present visual information to users), presents the ranked clone code snippets of the group. It may, for example, present or cause to be presented the ranked clone code snippets on a computer monitor or display using a GUI like that of 500 and 600 of FIGS. 5-6.

Figure 9:
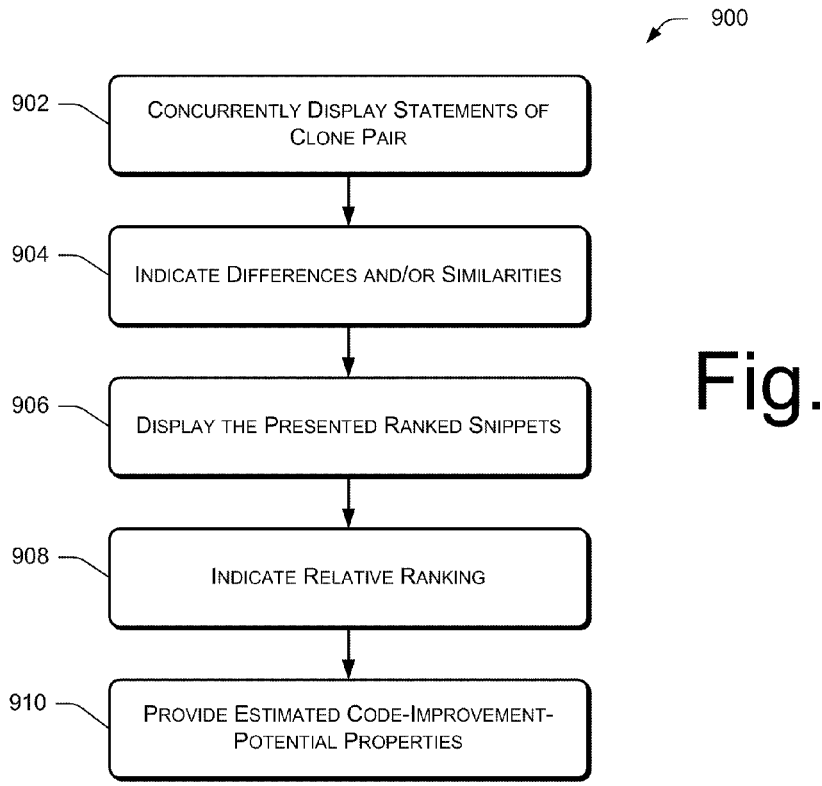
Figure 10:
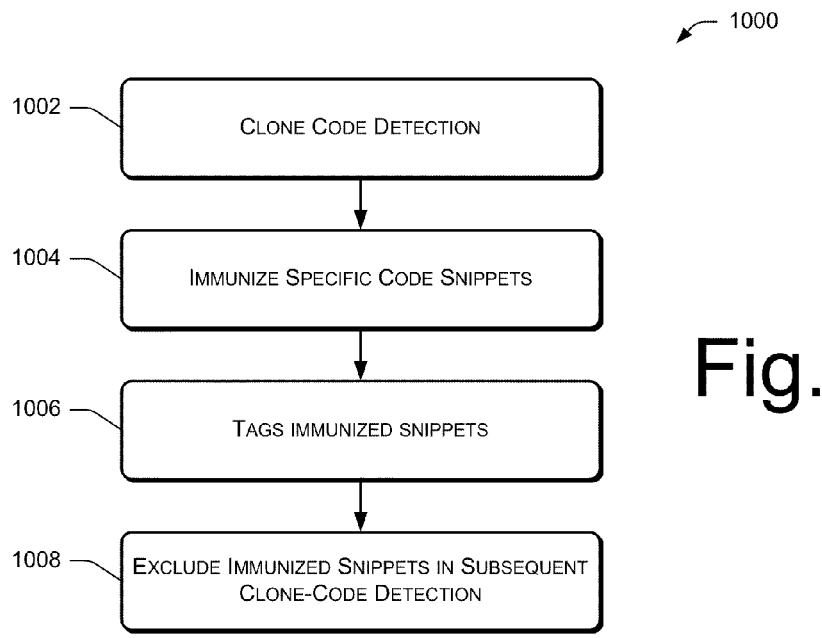

FIGS. 9-10 illustrate the processes 900 and 1000 for code-clone detection, reporting, and/or presentation. Process 900 includes an operation 902. Here, the computing devices (such as computing device 102), which are configured to detect, report and/or present code clone of the source code bases, concurrently display statements of a clone pair. For example, the clone pair may include the subject code snippet (e.g., 220) and statements of at least one of the clone code snippets of the group (e.g., clones 240). The computing devices that are configured to detect, report and/or present code clone of the source code bases qualifies as a particular machine or apparatus.

Next, at operation 904, the computing device 102 indicates differences, similarities, or both in the statements of the subject code snippet and the at least one of the clone code snippets. In doing this, it may show statements that are exactly matched, similarly matched, unmatched (different), disordered (matched but in the wrong order), and/or extra or missing (found in one but not the other).

At operation 906, the computing device 102 displays the presented ranked clone code snippets in an order relative to rankings. At operation 908, the computing device 102 indicates the relative ranking of the presented ranked clone code snippets. And at operation 910, the computing device 102 provides the estimated code-improvement-potential properties of each of the presented ranked clone code snippets.

Examples of results of these operations of process 900 are found in GUIs 500 and 600 of FIGS. 5-6.

In process 1000 of FIG. 10 and at operation 1002, the computing devices performs code-clone detection in accordance with new techniques described herein (e.g., see FIG. 8) or in accordance with other new or potentially conventional approaches.

Next, at operation 1004, the computing device 102 immunizes specific code snippets of the clones detected in operation 1002. Alternatively, whole functions, procedures, sub-procedures, and/or code bases may be immunized. That may be done, for example, by a user selecting or identifying specific code snippets for immunity for future code-clone detections.

In response to the immunization, the computer device, at operation 1006, tags the immune snippets as "immune."

At 1008, during a subsequent clone detection, the immune snippets are excluded from detection, analysis, and/or reporting. That includes, for example, the finding, estimating, ranking, or presenting operations discussed herein.

Examples of results of these operations of process 1000 are found in GUIs 500 and 600 of FIGS. 5-6.

Additional Details of Example Techniques

This sub-section describes portions of non-limiting embodiments of these techniques in greater detail.

As illustrated, FIG. 2 shows the clone detection core 140 receiving the subject code snippet 220 and the statement hash dictionary 210 as input. Also, shown is a software developer working at a software-development workstation (e.g., a computing device), which is called herein a software development station 222.

One scenario involves a software developer using the software development station 222 working on the code snippets found in the source code 202 of the specified code base stored in the code-base storage 160. Indeed, she is actively working on a particular code snippet of interest. That interest may be in the form of debugging, reprogramming, or just active interest for any reason that she might have.

Using one or more of the frontend components (e.g., the clone explorer 110, the clone finder 112, and the clone visualizer 114), she indicates her interest in the particular code snippet. That indication may, of course, be purposeful (by selection of code, click of a button, selection of a particular interface, etc.). But in alternative implementations, that indication may be inferred by the software developer spending time viewing, editing, etc. at particular code snippet.

Once interest in a particular code snippet is indicated, it becomes the subject code snippet 220 and clone detection functionality of the clone detection core 140 is initiated. The initial operation of the clone detection core 140 is performed by the rough matcher 230. When given, as input, the code snippet 220 (sp) and the statement hash dictionary 210 (D), the rough matcher 230 returns a list of candidate functions 232 ($L_{candidate}$(sp)) that contains possible clones of sp. The rough matcher 230 reduces the search space from the entire code base (or even multiple code bases) to $L_{candidate}$(sp), which is of a much smaller scale.

From there, the fine matcher 234 winnows down the list of clone candidates 232 to those that are actually clones 240 of the subject code snippet 220, in accordance with clone pair definition and similarity metric equation, which are equations (1) and (2), respectively.

The rough matcher 230 utilizes hit functions and generates clone candidate functions. A hit function ($F_{hit}$) is a function and it consists of n statements $F_{hit} = \{s_1^{F_{hit}}, s_2^{F_{hit}}, s_3^{F_{hit}}, \ldots s_n^{F_{hit}}\}$. T and H are tokenization and hash functions, respectively. The tokenized statements of $F_{hit}$ are mapped to a dictionary $D_{F_{hit}} = \{v_1, v_2, v_3, \ldots y_t\}$ where $v_i = H(T(s_j^{F_{hit}}))$. A code snippet sp consists of k statements $sp = \{s_1^{sp}, s_2^{sp}, s_3^{sp}, \ldots s_k^{sp}\}$. $F_{hit}$ is called a hit function of $s_p^{sp}$ when there exist p and q such that $H(T(s_p^{sp})) = H(T(s_q^{F_{hit}}))$.

A function $F_{candidate}$ is called a clone candidate function of a code snippet sp when there exists at least $n_{match}$ statements in sp with $F_{candidate}$ as one of its hit functions and $$n_{match} \geq \frac{\alpha}{2-\alpha} \cdot k$$

where k is the number of statements in sp; and α is the similarity threshold.

Suppose sp is an input code snippet (i.e., subject code snippet 220) and $$D = \left\{ D_{F_1} \cup D_{F_2} \cup D_{F_3} \cup \ldots D_{F_{N_{func}}} \right\}$$

is the hash dictionary (i.e., the statement hash dictionary 210) of a specified code base which consists of $N_{func}$ functions ($D_{Fi}$ is the hash dictionary of function $F_i$). For every statement $s_j$ in sp, the rough matcher 230 locates a list of hit functions $L_{hit}^{sj} = \{F_1, F_2, F_3, \ldots, F_r\}$ by retrieving from D the information of functions containing the same tokenized statement associated with the hash value of the tokenized $s_j$. The total hit count of every hit function is calculated via summarizing over all the statements in sp. A list of clone candidate functions of sp can then be identified from the hit functions using the total hit count. The following is an example of an outline of a rough-matching algorithm that may be performed by one or more implementations of the rough matcher 230:

TABLE 1

Outline of an example of the rough matching algorithm.

Proc RoughMatching (sp, D, α)
Input code snippet sp = $\{s_1^{sp}, s_2^{sp}, s_3^{sp}, \ldots s_k^{sp}\}$, $s_i^{sp}$ is the ith statement; statement hash dictionary D; similarity threshold α.
1. Let VFunctionHits be a vector of [$F_{hit}$, $n_{hits}$] where $F_{hit}$ is a hit function of $s_i^{sp}$ (1 ≤ i ≤ k); and $n_{hits}$ is the number of tokenized statements matched between $F_{hit}$ and sp.
2.  for each i ∈ {1, ..., k}
3.   HitFunctions ← search ($H(T(s_i^{sp}))$, D)
4. UpdateFuncHits(VFunctionHits, HitFunctions)
5. end for
6. for each $F_{hit}$ in VFunctionHits
7.  if $n_{hits}(F_{hit}) >= n_{match}$ (as defined in definition 3.3)

TABLE 1-continued

Outline of an example of the rough matching algorithm.

8.   Output ← $F_{hit}$
9.   end if
10.  end for

As its name implies, the rough matcher 230 performs a rough match. Therefore, some (or even many) of the list of functions of the clone candidates 232 ($F_{candidate}$) resulting from the rough matching might not be clones of the code snippet 220 (sp) in accordance with clone pair definition and similarity metric equations, which are equations (1) and (2) respectfully. There may be many reasons why this occurs. Some of those reasons include: 1) the matched tokenized statements may be so scattered in $F_{candidate}$ that the snippet consisting of these statements do not match sp; 2) multiple tokenized statements in $F_{candidate}$ may be mapped to the same tokenized statement in sp; 3) there might be mis-matched statements between sp and $F_{candidate}$ due to hash collisions, even though the probability of hash collision is quite low. Therefore, the fine matcher 234 prunes the list of functions of the clone candidates 232 so as to finely match the code snippet 220 and each clone candidate function in order to remove the noise and identify the real clones, in accordance with clone pair definition and similarity metric equations, which are equations (1) and (2), respectively.

Suppose F (for brevity, $F_{candidate}$ is denoted by F with regard to the description of fine-matching) is its clone candidate function. T is a tokenization function. The goal of fine matching is to find a snippet $sp^F$ of F that optimizes the following objective:

$$\max_{sp^F \in F} LOC(sp^F) \text{ s.t.} \begin{cases} S(sp, sp^F) \geq \alpha \\ \exists\, i,\, T(s_i^{sp}) = T(s_{start}^{sp^F}) \\ \exists\, j,\, T(sp_j) = T(s_{end}^{sp^F}) \end{cases} \quad (5)$$

where $sp^F$ is a snippet of F; $LOC(sp^F)$ is the number of statements in $sp^F$; $s_{start}^{sp^F}$ and $s_{end}^{sp^F}$ are the first and last statements of $sp^F$, respectively.

In order to optimize the fine matching, first, the similarity between the code snippet 220 (sp) and $sp^F$ is determined. Then the size of $sp^F$ is constrained based on the clone pair definition (of equations 1 and 2). Based upon the determined similarity and the constrained size, an iterative approach is used to perform the actual fine matching.

A bipartite graph $G^{sp,sp^F}=(V=(V_{sp}, V_{sp^F}), E)$ represents the matching relationship between sp and $sp^F$. In general, a bipartite graph (i.e., a bigraph) is understood by a skilled artisan to be a set of graph vertices decomposed into two disjoint sets such as no two graph vertices with the same set are adjacent. Each statement in sp is a vertex in vertex set $V_{sp}$, and each statement in $sp^F$ is a vertex in $V_{sp^F}$. The edge set E consists of statement pairs $(s_p^{sp}, s_q^{sp^F})$ that satisfies $T(s_p^{sp})=T(s_q^{sp^F})$. $G^{sp,sp^F}$ consists of a number of disjoint sub-graphs: $G^{sp,sp^F}=\{G_l, l=1, \ldots, n_u\}$, $G_l=(V=(V_{sp}^l, V_{sp^F}^l), E^l)$, $\forall s_{l_1}^{sp}$, $s_{l_2}^{sp} \in V_{sp}^l$, $S_{l_3}^{sp^F}$, $S_{l_4}^{sp^F} \in V_{sp^F}^l$, $T(s_{l_1}^{sp})=T(s_{l_2}^{sp})=T(c)=T(s_{l_4}^{sp^F})$, where $n_u$ is the number of unique tokenized statements in the code snippet 220 (sp) with at least one matching statement in $sp^F$. Each $G_l$ is a fully connected bipartite graph because all of its vertices are identical tokenized statements. The maximal count of one-to-one matching statement in $G_l$ is $\min(|V_{sp}^l|,$ $V_{sp^F}^l|)$, where |V| is the number of vertices in V. Based on this understanding, the number of one-to-one matching statements between sp and $sp^F$ is determined as follows:

$$n_{sp,sp^F} = \Sigma_{l=1}^{n_u} \min(|V_{sp}^l|, V_{sp^F}^l|) \quad (6)$$

Consequently, the similarity between sp and $sp^F$ can be calculated based on equations (6) and (2).

The rough matching results indicate that there are at most $n_{match}$ matching statements between sp and F. Based on the clone definition in equation (1), the number of statements in $sp^F$ is constrained by:

$$k_{min} \leq LOC(sp^F) \leq k_{max} \quad (7)$$

where $$k_{min} = \frac{\alpha}{2-\alpha} \cdot k,\; k_{max} = \frac{2}{\alpha} \cdot n_{matched} - k;$$

and k is the number of statements in sp.

The following is an example of an outline of a fine-matching algorithm that may be performed by one or more implementations of the fine matcher 234:

TABLE 2

Outline of an example of the fine matching algorithm.

Proc FineMatching (sp, $sp^F$, α, $k_{min}$, $k_{max}$)
Input code snippet sp; code snippet $sp^F$; similarity threshold α; minimal clone candidate snippet size $k_{min}$; maximal clone candidate snippet size $k_{max}$.
1.   if LOC ($sp^F$) < $k_{min}$
2.     return
3.   end if
4.   $k_{max}'$ = (LOC ($sp^F$) < $k_{max}$) ? LOC ($sp^F$) : $k_{max}$
5.   For each k' = $k_{max}'$, ... , $k_{min}$
6.     For each i = 1, ... , (LOC ($sp^F$) − k' + 1)
7.       if ∃ $j_1, j_2$ ∈ [1, ... , l], $s_i = s_{j_1}^{sp}$ and $s_{i+k'-1} = s_{j_2}^{sp}$
8.         $G^{sp,sp_{i,k'}}$ ← Graph (sp, $sp_{i,k'}$)
9.         $n_{sp,sp_{i,k'}}$ ← Matchings($G^{sp,sp_{i,k'}}$)
10.        Sim ← Similarity(sp, $sp_{i,k'}$, $n_{sp,sp_{i,k'}}$)
11.        if Sim ≥ α
12.          Output ← $sp_{i,k'}$
13.          FineMatching(sp, $sp_{1,i-1}$, α, $k_{min}$, k' − 1)
14.          FineMatching(sp, $sp_{i+k',LOC(sp^F)}$, α, $k_{min}$, k')
15.          Return
16.        end if
17.      end if
18.    end for
19. end for The input $sp^F$ of FineMatching( ) is set to F at the beginning to find all clones of sp in F. A sliding window (line 6) with variable length from $k_{max}$ to $k_{min}$ (line 5) is used to scan all snippets of $sp^F$. Based on the last two constraints in equation (3), only those snippets with first and last statements having matches in sp are processed (line 7). $s_i$ (line 7) represents the ith statements of $sp^F$. The function Graph( )(line 8) builds the bipartite graph between the two code snippets sp and $sp_{i,k'}$ (a snippet of $sp^F$ with k' statements starting from the ith statement). Matchings( )(line 9) calculates the number of one-to-one matching statements between sp and $sp_{1,k'}$, and Similarity( )(line 10) calculates their similarity. $sp_{i,k'}$ is recorded if it is identified as a clone (line 12); and the two remainder code fragments before and after $sp_{i,k'}$ in $sp^F$ will be further analyzed by calling FineMatching( ) recursively (line 13 and 14). Alternatively, the above example algorithm may be adjusted in various ways. For example, Graph( ) does not need to build the bipartite graph directly every time. The graph can be built iteratively by updating the graph of the last snippet in the loop because most often the current snippet largely overlaps with the previous snippet.

In the case of detecting whether two functions F1 and F2 are clones, sp and $sp^F$ in equation (5) become F1 and F2, respectively. Therefore, the approach may be adjusted to build the bipartite graph between F1 and F2 and calculate the similarity based on equations (2) and (6) with $sp_{i,k}^F$ equal to F.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method implemented by one or more computing devices configured to detect and analyze code clones in one or more source code bases, the method comprising:
   receiving a selection of a subject code snippet based at least in part upon user input;
   at least partly in response to the receiving of the selection, obtaining the subject code snippet;
   identifying a group of clone code snippets in the one or more source code bases;
   comparing statements of the subject code snippet and statements of at least one of the clone code snippets of the group of the identified clone code snippets, wherein the comparing includes identifying differences, similarities, or both between the statements of the subject code snippet and the statements of the at least one of the clone code snippets of the group of the identified clone code snippets; and
   estimating, by the one or more computing devices and based at least in part on the comparing the statements of the subject code snippet and the statements of the at least one of the clone code snippets of the group, code-improvement-potential properties of one or more of the clone code snippets of the group of the identified clone code snippets.

2. The method as recited in claim 1, further comprising, before the receiving the selection of the subject code snippet and the obtaining the subject code snippet, preprocessing the one or more source code bases to generate a statement hash dictionary, the preprocessing including:
   parsing source code of the one or more source code bases to identify and normalize statements in the source code;
   tokenizing the identified and normalized statements by mapping keywords and operators of each of the identified and normalized statements to a unique token;
   indexing the tokenized statements to create an index value for each tokenized statement; and
   storing each index value in the statement hash dictionary with an association between the index value of each tokenized statement and one or more locations in the source code where each tokenized statement is found; and
   the identifying of the group of clone code snippets comprises:
      utilizing the statement hash dictionary and the subject code snippet to find the group of clone code snippets in the one or more source code bases; and
      comparing tokenized statements in the subject code snippet and the tokenized statements in the one or more source code bases to find the group of clone code snippets.

3. The method as recited in claim 1, wherein each of the identified clone code snippets of the group of clone code snippets includes at least one of a true clone or a near clone of the subject code snippet, and each of the identified clone code snippets has a similarity metric relative to the subject code snippet, the similarity metric of each clone code snippet of the group meeting or exceeding a similarity threshold, the similarity metric of each clone code snippet of the group being calculated in accordance with:

$$S(sp_1, sp_2) = \frac{m}{\frac{LOC(sp_1) + LOC(sp_2)}{2}}$$

where S is the similarity metric of the subject code snippet ($sp_1$) and a clone code snippet ($sp_2$), m represents a number of statements that match between $sp_1$ and $sp_2$, and $LOC(sp_1)$ and $LOC(sp_2)$ are the number of total statements in $sp_1$ and $sp_2$, respectively.

4. The method as recited in claim 1, wherein the identifying the group of clone code snippets comprises:
   rough-matching the subject code snippet to a list of candidate functions in the one or more source code bases, each candidate function being determined to include one or more possible cloned code snippets that have a likelihood of being a clone or near clone of the subject code snippet based upon a rough-matching calculation of functions in the one or more source code bases, at least some of the one or more possible cloned code snippets having a similarity metric falling below a defined similarity threshold; and
   fine-matching the subject code snippet with the list of candidate functions, the fine-matching including identifying the clone code snippets of the group in the list of candidate functions that have the similarity metric that meets or exceeds the defined similarity threshold.

5. The method as recited in claim 1, wherein the estimating code-improvement-potential properties comprises calculating quantitative bug-potential estimation metrics of the clone code snippets of the group, the bug-potential estimation metric of a clone code snippet being a measure of a likelihood that the clone code snippet has one or more bugs based at least in part on a degree of semantic differences between the clone code snippet and at least one other clone code snippet of the group of the identified clone code snippets.

6. The method as recited in claim 1, wherein the estimating code-improvement-potential properties comprises calculating quantitative code-refactoring-potential estimation metrics of the clone code snippets of the group, the code-refactoring-potential estimation metric of a clone code snippet being a measure of a likelihood that the clone code snippet is a viable candidate for refactoring based at least in part on a degree of semantic differences between the clone code snippet and at least one other clone code snippet of the group of the identified clone code snippets.

7. The method as recited in claim 1, further comprising:
   concurrently displaying statements of the subject code snippet and statements of at least one of the clone code snippets of the group of the identified clone code snippets; and indicating the differences, the similarities, or both in the statements of the subject code snippet and the statements of the at least one of the clone code snippets.

8. The method as recited in claim 1, further comprising:
ranking at least some of the clone code snippets of the group of the identified clone code snippets based at least in part on one or more of the estimated code-improvement-potential properties; and
causing presentation of the ranked clone code snippets of the group of the identified clone code snippets, wherein the causing presentation of the one or more clone code snippets of the group of the identified clone code snippets comprises at least one of:
causing to be displayed the presented ranked clone code snippets in an order relative to rankings;
indicating a relative ranking of the presented ranked clone code snippets; or
providing one or more of the estimated code-improvement-potential properties of each of the presented ranked clone code snippets.

9. The method as recited in claim 1, further comprising receiving user input identifying and confirming code-improvement-potential properties of one or more of the clone code snippets of the one or more source code bases as being immune to code-clone detection.

10. The method as recited in claim 9, further comprising:
identifying one or more code snippets of the one or more source code bases as being immune to code-clone detection; and
excluding the identified immune code snippets from the group of clone code snippets, thereby excluding the one or more identified immune code snippets from one or more of the identifying the group of clone code snippets, the estimating code-improvement-potential properties, ranking at least some of the clone code snippets, or causing the presentation of the one or more clone code snippets of the identified clone code snippets.

11. A computing device comprising:
one or more processors; and
one or more computer-readable storage media storing instructions, the instructions executable by the one or more processors to perform operations comprising:
receiving a selection of a subject code snippet based at least in part upon user input;
at least partly in response to the receiving of the selection, obtaining the subject code snippet;
identifying a group of clone code snippets in one or more source code bases that have a similarity metric that meets or exceeds a similarity threshold;
comparing statements of the subject code snippet and statements of clone code snippets of the group of the identified clone code snippets to identify differences, similarities, or both between the statements of the subject code snippet and the statements of the clone code snippets of the group of the identified clone code snippets; and
determining an estimate of code-improvement-potential properties of the clone code snippets of the group based at least in part on the comparing the statements of the subject code snippet and the statements of the clone code snippets of the group.

12. The computing device as recited in claim 11, wherein the identifying the group of clone code snippets comprises:
rough-matching the subject code snippet to a list of candidate functions in the one or more source code bases, each candidate function being determined to include one or more possible cloned code snippets that have a likelihood of being a clone of the subject code snippet based upon a rough-matching calculation of functions in the one or more source code bases, the similarity metric of at least one of the one or more possible cloned code snippets is below the similarity threshold; and fine-matching the subject code snippet with the list of candidate functions, the fine-matching including identifying the clone code snippets of the group in the list of candidate functions that have the similarity metric that meets or exceeds the similarity threshold.

13. The computing device as recited in claim 11, wherein the similarity metric of an identified clone code snippet is indicative of a similarity between the identified clone code snippet and the subject code snippet.

14. The computing device as recited in claim 11, the method further comprising:
concurrently displaying statements of the subject code snippet and statements of at least one of the clone code snippets of the group; and
indicating differences, similarities, or both in the statements of the subject code snippet and the statements of the at least one of the clone code snippets of the group.

15. One or more memory devices storing processor-executable instructions that, when executed, cause one or more processors to perform a method of analyzing code clones in one or more source code bases, the method comprising:
at least partly in response to receiving a selection of a subject code snippet based at least in part upon user input, obtaining the subject code snippet;
identifying a group of clone code snippets corresponding to the subject code snippet;
comparing statements of the subject code snippet and statements of one or more clone code snippets of the group of clone code snippets, wherein the comparing includes identifying differences, similarities, or both between the statements of the subject code snippet and the statements of the one or more of the clone code snippets of the group;
estimating, based at least in part on the comparing the statements of the subject code snippet and the statements of the one or more clone code snippets of the group, code-improvement-potential properties of one or more of the clone code snippets of the group; and
causing presentation of at least some of the clone code snippets of the group of clone code snippets with an indication of the estimated code-improvement-potential properties of the presented clone code snippets.

16. The one or more memory devices as recited in claim 15, wherein the estimating of the code-improvement-potential properties comprises calculating bug-potential estimation metrics of the clone code snippets of the group, the bug-potential estimation metric of a clone code snippet being a measure of a likelihood that the clone code snippet has one or more bugs.

17. The one or more memory devices as recited in claim 15, wherein the estimating of the code-improvement-potential properties comprises calculating code-refactoring-potential estimation metrics of the clone code snippets of the group, the code-refactoring-potential estimation metric of a clone code snippet being a measure of a likelihood that the clone code snippet is a viable candidate for refactoring.

18. The method as recited in claim 1, further comprising:
assigning a ranking to individual clone code snippets of the group of the identified clone code snippets based at least in part on one or more of the estimated code-improvement-potential properties; and
causing presentation of one or more clone code snippets of the group of the identified clone code snippets, wherein presented clone code snippets are ordered, relative to one another, based on the assigned rankings.

19. The one or more memory devices as recited in claim 15, wherein presented clone code snippets are ordered, relative to one another, based on assigned rankings.

20. The one or more memory devices as recited in claim 15, wherein the estimating the code-improvement-potential properties of one or more of the clone code snippets of the group includes determining that at least one of:
- a first statement of the subject code snippet is similar to a first corresponding statement of a clone code snippet of the group;
- a second statement of the subject code snippet is exactly matched with a second corresponding statement of the clone code snippet of the group; or
- a third statement of the subject code snippet does not have an equivalent statement in the clone code snippet of the group.

* * * * *